United States Patent [19]

Oetiker

[11] 4,083,086
[45] Apr. 11, 1978

[54] TIGHTENING DEVICE FOR ATTACHING A HOSE CLAMP

[76] Inventor: Hans Oetiker, 21, Oberdorfstrasse, Horgen, Switzerland

[21] Appl. No.: 677,525

[22] Filed: Apr. 16, 1976

Related U.S. Application Data

[63] Continuation-in-part of Ser. No. 564,132, Apr. 1, 1975, Pat. No. 3,981,049, which is a continuation of Ser. No. 349,697, Apr. 10, 1973, abandoned.

[51] Int. Cl.² .............................................. B65D 63/02
[52] U.S. Cl. .................................... 81/9.3; 24/20 TT; 24/20 R
[58] Field of Search ............... 81/9.3; 140/93.2; 24/20 TT, 20 CW, 20 R, 20 W, 20 S, 20 LS

[56] References Cited

U.S. PATENT DOCUMENTS

| 942,017 | 11/1909 | Smith | 81/9.3 |
|---|---|---|---|
| 1,965,207 | 7/1934 | Walker | 24/20 TT |
| 2,277,343 | 3/1942 | Medved | 81/9.3 |
| 2,302,475 | 11/1942 | Richards | 81/9.3 |
| 3,475,793 | 11/1969 | Oetiker | 24/20 CW |
| 3,491,411 | 1/1970 | Basson | 24/20 TT |

FOREIGN PATENT DOCUMENTS 1,187,079  2/1965  Germany ..................... 24/20 TT Primary Examiner—Paul R. Gilliam
Assistant Examiner—Kenneth J. Dorner
Attorney, Agent, or Firm—Craig & Antonelli

[57] ABSTRACT

Apparatus for clamping the hose of a nipple including a clamp of the type having a band with interengageable barb means and apertures spaced from one another for accommodating maintenance of the band in a clamping position around a hose. A tightening device for accommodating assembly and disassembly of the band around a hose is provided, which tightening device includes a rigid housing having apertures engageable with barbs on the band and a rigid member having teeth for engaging in apertures in the band slidably guidably carried by the rigid housing. A manually rotatable gear wheel is pivotally mounted in the fixed housing and includes gear teeth engageable with gear teeth at the rigid bar such that pivotal movement of the gear wheel forces the rigid bar to move in the circumferential direction with respect to the rigid housing. The rigid housing and rigid bar are constructed so as to be guided for movement with respect to one another along a circular arc corresponding in radius to the radius of the band or hose being clamped. The gear wheel is rigidly attached to a manually operable lever.

22 Claims, 7 Drawing Figures

TIGHTENING DEVICE FOR ATTACHING A HOSE CLAMP

BACKGROUND AND SUMMARY OF THE INVENTION

This application is a continuation-in-part application of my copending application Ser. No. 564,132, filed Apr. 1, 1975, now U.S. Pat. No. 3,981,049, issued Sept. 21, 1976 which copending application was a continuation of application Ser. No. 349,697, filed Apr. 10, 1973, now abandoned. Priority under 35 USC 119 was claimed in conjunction with this copending application based upon applications filed in Switzerland on Apr. 11 and Aug. 9, 1972 under application Nos. 5273/72 and 11.744/72. The subject matter of the above noted copending application is incorporated herein by reference thereto to the extent necessary for a complete understanding of the present invention.

In the above identified copending application, clamps as shown which include a band having apertures at one end and barb members at the other end which lockingly interengage with one another to hold the band in a fixed clamping position. To accommodate tightening of the band into a clamping position, and also to accommodate unclamping and disassembly of the band by disengagement of the barbs from the apertures, this copending application discloses several different types of tightening devices. One of these tightening devices included a lever having teeth extending radially from a pivot thereon, which pivot supported a band extending circumferentially therefrom. This band included openings engageable with barbs provided at the clamping band and the teeth of the gear wheel engaged in apertures provided at another position of the clamping band such that rotational movement of the lever connected to the gear wheel accommodated a tightening of the band. In another embodiment of this copending application, a threaded spindle was provided for moving a tooth engageable in apertures at one position of the clamping band, while the spindle was pivotally connected to another member engageable over barb means of the band. Another embodiment of this copending application included a simple screw-driver like instrument, which had a central protruding portion and lateral wing portions, whereby the central protruding portion could be inserted into an aperture at the band and the pivoted against a fulcrum at an end circling portion of the band to accommodate tightening thereof.

The present invention is directed to an improved clamping arrangement, and particularly to an improved tightening device for assembling and disassembling the clamping band. According to one aspect of the present invention, the relatively movable coupling elements of the tightening device are guided with respect to one another along a predetermined circumferential path corresponding to the circumference of the clamping band when in the clamped position, whereby the clamping action caused by relative movement of the coupling elements of the tightening device are firmly controlled and guided so as to act on the band only in the circumferential direction thereof, without slippage and the like. In preferred embodiments of the present invention, a rigid bar is provided which is guided along circular arc surfaces of a rigid housing. The rigid bar includes tooth means ajacent one end thereof for engagement in apertures of the band, by way of a slot on an overlapping portion of the band. The rigid housing includes aperture means engageable over barb means provided at the overlapping portion of the band. With this construction, relative movement of the rigid bar with the teeth and the rigid housing with the aperture is assured to be along a circular arc conforming to the desired clamping and tightening movement of the band section. Since the two coupling elements of the tightening device are securely guided for movement in the circumferential direction of the band with respect to one another, the coupling elements are quite easily and firmly maintained in engagement with the respective portions of the band during assembly and disassembly operations. This is particularly important with relatively thin clamping bands where the portions of the band being engaged by the coupling elements of the tightening device are limited in dimension so as to simplify the construction of the tightening band, and also so as to minimize the total space being taken by the clamping band when in an assembled position.

Another feature of the tightening device of the present invention is the provision of gear teeth on two separate parts of the tightening device for accommodating the force transfer, whereby increased leverage in applying the tightening forces are obtained. According to a preferred embodiment of the invention, a rigid housing of the tightening device, which also contains the apertures for engaging the barb means of the clamping band pivotally supports a gear wheel carried by a manually operable lever. Also slidable within this rigid housing, is a rigid bar carrying the teeth which engage in apertures in the clamping band, this rigid bar including gear teeth engageable with the teeth of the gear wheel. With this construction, a firm transfer of tightening forces from the manually operable handle to the clamping band is obtained in a reliable, economical manner.

The combination of the above-noted features, namely the rigid guidance along a circular arc of the coupling elements with respect to one another, and the utilization of gear teeth at the pivot lever and at the slidable bar containing the teeth engageable in the apertures in the clamping band, cooperate to make possible the application of very high band tightening forces. The application of extremely high band tightening forces is important, especially in embodiments wherein the clamping band is constructed without and intentional spring bulges or the like, and also especially in high pressure environment usages of the clamping bands. With the apertures of the present invention, one can utilize the simple flat clamping band, and still maintain a reliable assembly and disassembly of same in high pressure installations.

The present invention not only contemplates improved clamping apparatus as compared to the above noted copending application, but also contemplates a substantially improved tightening device as compared to the prior art, such as exemplified by British Pat. No. 400,139, German Auslegeschrift 1,187,079; U.S. Pat. No. 1,965,207; and U.S. Pat. No. 3,261,062 (note that these prior art arrangements also relate to different types of clamping bands than primarily contemplated for use in conjunction with the present invention).

These and other objects, features and advantages of the present invention will become more apparent from the following description when taken in connection with the accompanying drawings which shows, for purposes of illustration only, a single embodiment in accordance with the present invention.

DETAILED DESCRIPTION OF THE DRAWINGS

Figure 1:
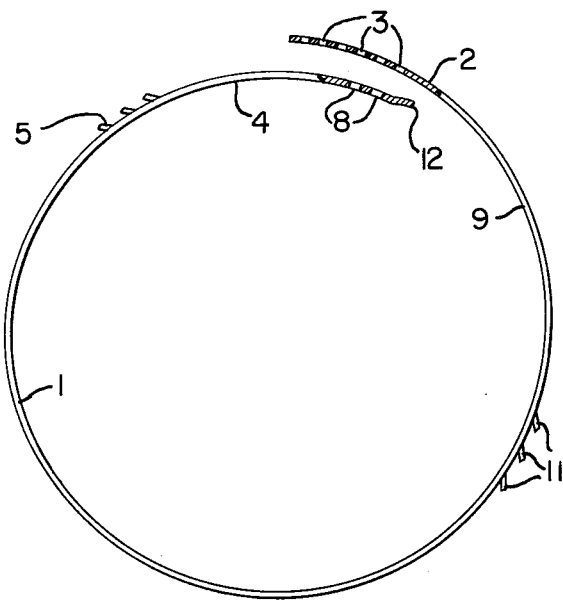
FIG. 1 is an elevational view, partly in cross section of a band of a clamp according to the present invention, taken in the axial direction and illustrating the clamp in the open position.
Figure 2:
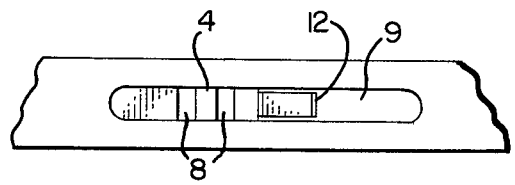
FIG. 2 is a partial plan view of the band according to FIG. 1, taken in the direction of the arrow X.

Referring now to the drawings, wherein like reference numerals are used throughout the various views to designate like parts, the thickness of the band is illustrated in the figures larger than in actual cases for the sake of greater clarity.

Referring to FIG. 1, the band 1 includes an upper end 2 provided with perforation apertures 3 as well as a lower end 4 provided with three barbs 5. When the band is placed about the hose 6 (FIG. 3), the barbs 5 engage in three of the perforation apertures 3 of the upper end 2 of the band 1 as can also be seen from FIG. 3. The hose 6 surrounds a nipple 7. The band is provided at its lower end 4, on the side of the barb 5 nearer the end with two perforation apertures 8 of the same type as apertures 3. At the upper end of the band 2, displaced in the circumferential direction toward the center of the band in relation to the perforation apertures 3, is provided a slot 9. Upon placement of the band 1 about the hose 6, the perforation apertures 8 are then located within the area of the section of slot 9 adjacent the upper end 2 of the band.

A tightening device 10 is provided which accommodates hooking of the barbs 5 into the apertures 3 during assembly of the clamp. This tightening device 10 is adapted to be attached to the band for the assembly and disassembly operations and is again removable after the assembly or disassembly has taken place.

The upper end 2 of the band 1 is provided with three barbs 11 pointing with the tips thereof in a circumferential direction opposite the direction of the tips of the barbs 5. Barbs 11 are provided displaced in the circumferential direction toward the center with respect to the slot 9. The tightening device is provided with two coupling elements movable with respect to one another for purposes of tightening. One of these coupling elements engages with the apertures 8 of the band while the other of the coupling elements engages over the barbs 11 of the band.

The lower end 4 of band 1 is provided with an upwardly bent tongue 12 which is guided in the slot 9.

The tightening device 10 includes a manually operable pivot lever 13 which has a gear wheel 14 rigidly attached thereto. Lever 13 and gear 14 are pivotally mounted in a fixed housing 15 by way of a detachable pivot pin 16. Pivot pin 16 is held in position at the housing 15 by way of split washers 17. Gear wheel 14 includes a plurality of gear teeth 14' spaced from one another around the circumference of the gear wheel 14 other than the portion thereof rigidly attached to the lever 13. The rigid housing 15 includes a U-shaped part having a circumferentially inner web section 18 joined by lateral edge sections 19, 19'. Rigidly attached between the edge sections 19' is an outer rigid guide member portion 20. The radially inward (as seen with respect to a circular band being clamped) edge of part 20 of the rigid housing provides a first guide surface and edge 18A of the web portion 18 provides a second guide surface. Mounted for sliding movement along these guide surfaces 18A and 20A as well as along lateral surfaces of edge portions 19 of the rigid housing, is a rigid bar 21.

This rigid bar 21 is guided for movement along a circular arc defined by the respective guide surfaces 18A, 20A. At one end of this rigid bar 21 are provided coupling teeth 22, which coupling teeth 22 are adapted to engage through slot 9 into apertures 8 during assembly and disassembly operations. Facing radially oppositely by the coupling teeth 22 are provided gear teeth 23 on the rigid bar 21. These gear teeth 23 are interengaged with the teeth 14' of the gear wheel 14, such that pivotal movement of the lever 13 effects sliding movement of the rigid bar 21 with respect to the rigid housing.

The bottom or web portion 18 of the rigid housing includes three apertures 24, which apertures 24 are configured for accommodating barbs 11 of the clamping band during clamping operations.

Figure 6:
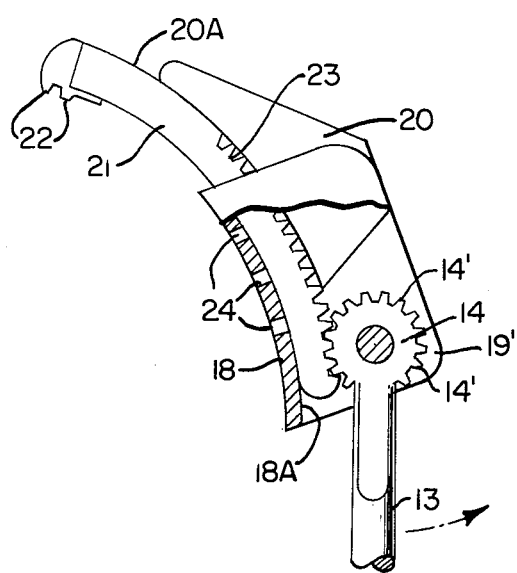
FIG. 6 is a partial cross-sectional view taken along section VI—VI of FIG. 5 and showing the tightening device in a position with the coupling elements maximally spaced from one another.
Figure 7:
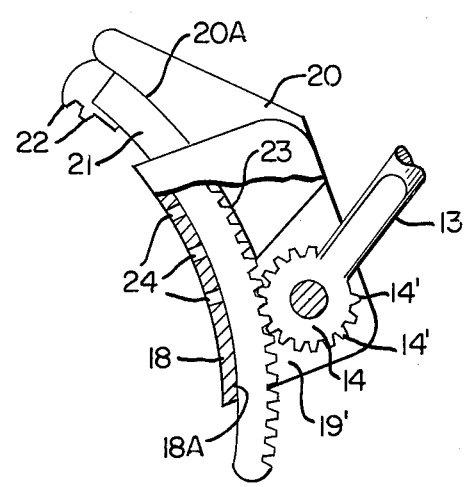
FIG. 7 is a view similar to FIG. 6 but showing the coupling elements of the tightening device in a position maximally close to one another.

As can best be seen in the sectional views of FIG. 6 (showing the teeth 22 maximally spaced from the apertures 24) and FIG. 7 (showing the teeth 22 minimally spaced from the apertures 24), the section 20 of the rigid housing is configured so as to accommodate the pivotal movement of the gear wheel 14 between the two positions shown in FIGS. 6 and 7.

Although the operation of the clamping assembly of the present invention should be readily understood from the above description of the clamp and the tightening device, following is a brief description of the assembly and disassembly steps.

Figure 3:
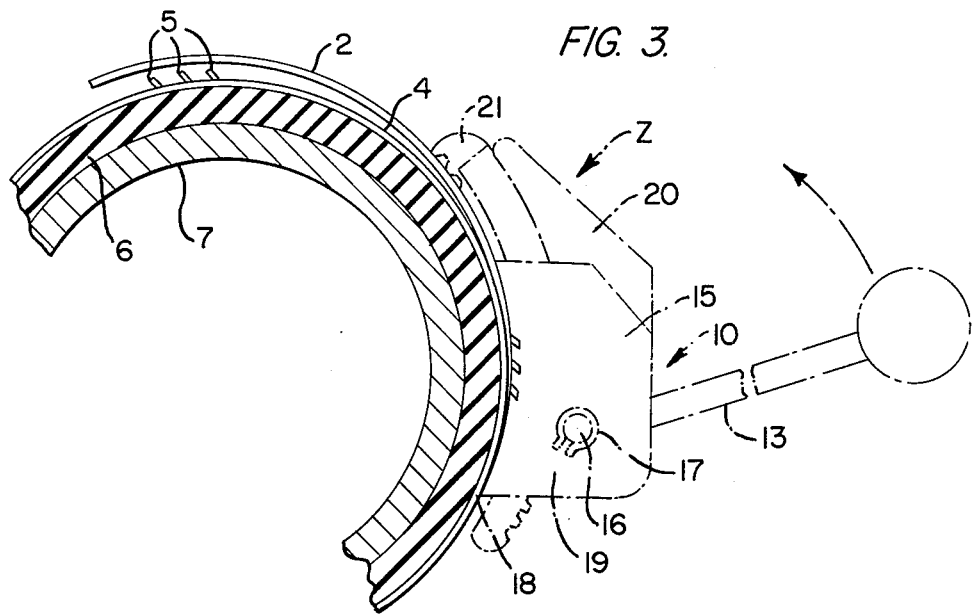
FIG. 3 is a partial cross-sectional view of an installed clamp with a band according to FIG. 1 and with a tightening device of the present invention attached thereto.
Figure 4:
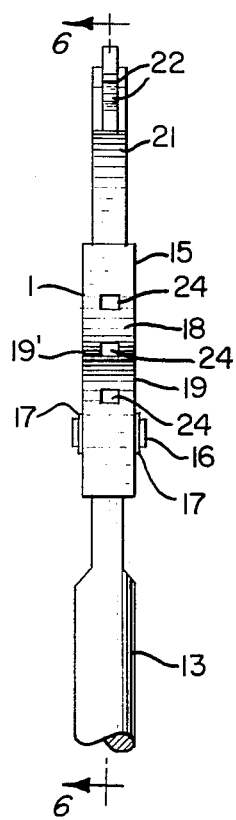
FIG. 4 is a partial view of the tightening device along, taken in the direction of arrow Y of FIG. 3.
Figure 5:
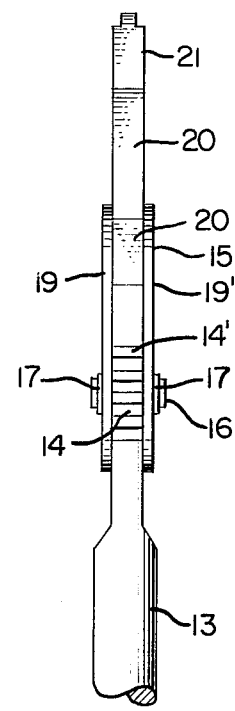
FIG. 5 is a partial view of the tightening device of the present invention along, taken in the direction of arrow Z of FIG. 3.

When it is desired to clamp a hose 6 tightly about a nipple 7, a clamping band 1 is placed circumferentially about the hose 6, which has previously been placed around the nipple 7. The band 1 is placed so that the apertures 8 are disposed radially inwardly of the overlapping portion of the bands containing the slot 9. The tightening device 10 is then placed in position such as shown in FIG. 3 with the barbs 11 engaged in apertures 24 and with the lever 13 as shown in FIG. 6 so that the teeth 22 have maximum room to move for the tightening operations. The teeth 22 are inserted into the corresponding apertures 8, via the slot 9, and then the lever 13 is pivoted in the direction of the arrows of FIGS. 6 and 7, while the ridid housing is maintained in position against the outer circumference of the band, whereby the apertures 8 of the one end of the band are moved correspondingly closer to the barbs 11. The circumferential circular guidance of the relative movement of the teeth 22 and the apertures 24 assures a firm grip of the band during the tightening operation. When the band has been maximally tightened, the end portion containing apertures 3 is to be radially inwardly pressed so as to engage over the barbs 5 to lock the band in the clamping position. At this time, the movement of the lever 13 can be reversed so as to release the tightening device 10 from the clamp. Disassembly of the clamping band is done by reversing the above sequence of events.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Apparatus for clamping a hose and a nipple including a tightening device for assembly and disassembling a hose and nipple clamp of the type having a band with first and second releasably interengageable means spaced from one another along the length of the band; said tightening device comprising:

first and second coupling elements engageable with a band at respective spaced positions along the length of said band, forcing means for forcibly moving said first and second coupling elements with respect to one another to effect movement of said first and second means of said band to positions accommodating interengagement and disengagement of said first and second means with respect to one another, and guide means for guiding relative movement of said first and second coupling elements along a predetermined circumferential path about a hose and nipple being clamped during assembly and disassembly operations, wherein said guide means includes a first rigid member with a first curved guiding surface formed thereon and a second rigid member with a second curved guiding surface formed thereon, wherein said first and second curved guiding surfaces are slidably engageable with one another to constrain movement of said first and second rigid members with respect to one another only along a predetermined curved path defined by said first and second guiding surfaces, and wherein said first coupling element is fixedly connected with said first rigid member and said second coupling element is fixedly connected with said second rigid member, whereby said first and second coupling elements are constrained by said guide means to move with respect to one another only along a curved path parallel with said first and second curved guiding surfaces.

2. Apparatus according to claim 1, wherein said forcing means includes a first set of gear teeth means carried by and movable with one of said coupling elements and a second set of gear teeth means engageable with said first set.

3. Apparatus according to claim 1, wherein said first and second curved guiding surfaces extend along a circular arc having a radius of curvature corresponding to the radius of the hose being clamped.

4. Apparatus according to claim 3, wherein said forcing means includes a first set of gear teeth means carried by and movable with one of said coupling elements and a second set of gear teeth means engageable with said first set.

5. Apparatus according to claim 1, wherein said first coupling element includes coupling tooth means engageable with band aperture means of said band, and wherein said second coupling element includes coupling aperture means engageable with barb means of said band.

6. Apparatus according to claim 5, wherein said coupling tooth means are carried by a rigid bar which constitutes said first rigid member, said rigid bar having a first set of gear teeth facing radially oppositely of said coupling tooth means, wherein said coupling aperture means are in a rigid housing which movably supports said rigid bar, said rigid housing constituting said second rigid member, and wherein said forcing means includes a gear wheel pivotally mounted in said rigid housing and having a second set of gear teeth which are engaged with said first set of gear teeth so that pivotal movement of said gear wheel effects relative movement of said rigid housing and said rigid bar.

7. Apparatus according to claim 6, wherein said gear wheel is rigidly carried by a manually operable lever which extends substantially radially outwardly of said band during assembly and disassembly operations.

8. Apparatus according to claim 6, wherein said rigid housing slidably supports said rigid bar at both the radial inner and outer circumferential edges of said rigid bar.

9. Apparatus according to claim 7, wherein said gear wheel is detachably attached to said rigid housing by a pivot pin formed separately of both said gear wheel and said rigid housing.

10. Apparatus according to claim 1, further comprising a clamp of the type having a band with first and second releasably interengageable means spaced from one another along the length of the band.

11. Apparatus according to claim 10, wherein said coupling elements are engageable with said band at positions spaced from said interengageable means.

12. Apparatus according to claim 11, wherein said interengageable means are respective barb means and aperture means at said band.

13. Apparatus according to claim 5, further comprising a clamp of the type having a band with first and second releasably interengageable means spaced from one another along the length of the band.

14. Apparatus for clamping a hose and a nipple including a tightening device for assembly and disassembling a hose and nipple clamp of the type having a band with first and second releasably interengageable means spaced from one another along the length of the band; said tightening device comprising:

first and second coupling elements engageable with a band at respective spaced positions along the length of said band, and forcing means for forcibly moving said first and second coupling elements with respect to one another to effect movement of said first and second means of said band to positions accommodating interengagement and disengagement of said first and second means with respect to one another, and wherein said forcing means includes a first set of gear teeth means carried by and movable with one of said coupling elements and a second set of gear teeth means engageable with said first set, wherein said first coupling element includes coupling tooth, means engageable with band aperture means of said band, said coupling tooth means being fixedly connected to a rigid curved bar, wherein said second coupling element includes coupling aperture means engageable with barb means of said band, said coupling aperture means being disposed in a rigid curved housing, said rigid curved bar and rigid curved housing including engageable sliding guide surfaces for constraining all relative movement of said coupling tooth means and coupling aperture means to a curved path extending circumferentially of a hose and nipple being clamped during assembly and disassembly operations.

15. Apparatus according to claim 14, wherein said rigid bar has a first set of gear teeth facing radially oppositely of said coupling tooth means, and wherein said forcing means includes a gear wheel pivotally mounted in said rigid housing and having a second set of gear teeth which are engaged with said first set of gear teeth so that pivotal movement of said gear wheel effects relative movement of said rigid housing and said rigid bar.

16. Apparatus according to claim 15, wherein said gear wheel is rigidly carried by a manually operable lever which extends substantially radially outwardly of said band during assembly and disassembly operations.

17. Apparatus according to claim 16, wherein said rigid housing slidably supports said rigid bar at both the radial inner and outer circumferential edges of said rigid bar.

18. Apparatus according to claim 17, wherein said gear wheel is detachably attached to said rigid housing by a pivot pin formed separately of both said gear wheel and said rigid housing.

19. Apparatus according to claim 14, further comprising a clamp of the type having a band with first and second releasably interengageable means spaced from one another along the length of the band.

20. Apparatus according to claim 19, wherein said coupling elements are engageable with said band at positions spaced from said interengageable means.

21. Apparatus according to claim 1, wherein said first rigid member is a curved rigid bar having said first coupling elements formed integrally therewith, said first coupling elements being located at one end of said rigid bar at a spacing from said first curved guiding surface, and wherein said second rigid member is a housing having guiding surfaces slidably engageable with both respective radial inner and outer surfaces of said rigid bar.

22. Apparatus according to claim 20, wherein said rigid bar housing also includes side walls for constraining movement of said rigid bar in direction transverse to said curved path.

* * * * *